(12) United States Patent
Crump et al.

(10) Patent No.: US 11,796,040 B2
(45) Date of Patent: Oct. 24, 2023

(54) METHOD(S) TO APPLY TENSION TO INCREASE DRIVETRAIN JUMP TORQUE CAPACITY

(71) Applicant: BorgWarner Inc., Auburn Hills, MI (US)

(72) Inventors: Matthew W. Crump, Cortland, NY (US); Christopher Van Loon, Ithaca, NY (US); Sean R. Simmons, Ithaca, NY (US); Joseph P. Goodsell, Groton, NY (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 17/648,488

(22) Filed: Jan. 20, 2022

(65) Prior Publication Data
US 2022/0235851 A1    Jul. 28, 2022

Related U.S. Application Data

(60) Provisional application No. 63/140,457, filed on Jan. 22, 2021.

(51) Int. Cl.
| | |
|---|---|
| *F16H 7/08* | (2006.01) |
| *F16H 7/18* | (2006.01) |
| *F16H 7/06* | (2006.01) |

(52) U.S. Cl.
CPC ............... *F16H 7/08* (2013.01); *F16H 7/06* (2013.01); *F16H 7/18* (2013.01); *F16H 2007/081* (2013.01); *F16H 2007/0804* (2013.01); *F16H 2007/0844* (2013.01); *F16H 2007/0846* (2013.01); *F16H 2007/0872* (2013.01); *F16H 2007/0874* (2013.01)

(58) Field of Classification Search
CPC ..... F16H 7/00; F16H 7/06; F16H 7/08; F16H 2007/081; F16H 2007/0804; F16H 2007/0842; F16H 2007/0844; F16H 2007/0846; F16H 2007/0863; F16H 2007/0872; F16H 2007/0874; F16H 2007/0893; F16H 7/18; F16H 2007/185; F02B 67/04; F02B 67/06; B60K 17/342; B60K 17/344; B60K 23/00; B60K 57/05
See application file for complete search history.

(56) References Cited

U.S. PATENT DOCUMENTS

| | | | | |
|---|---|---|---|---|
| 1,579,681 A | * | 4/1926 | Weller ...................... | F16H 7/08 474/111 |
| 1,892,067 A | * | 12/1932 | Kingsley ............... | F16H 7/1254 123/90.31 |
| 2,129,107 A | * | 9/1938 | Taylor ...................... | F16H 7/08 474/111 |

(Continued)

FOREIGN PATENT DOCUMENTS

| | | | | |
|---|---|---|---|---|
| CN | 2859091 Y | * | 1/2007 | ..... F16H 2007/0874 |
| EP | 1070875 A3 | | 4/2001 | |

(Continued)

*Primary Examiner* — Michael R Mansen
*Assistant Examiner* — Raveen J Dias
(74) *Attorney, Agent, or Firm* — Brown & Michaels, PC

(57) ABSTRACT

A chain tensioning device which combats natural build-up of chain slack. In controlling the chain slack, the torque at which a chain jumps occurs is delayed resulting in a higher jump torque performance.

4 Claims, 11 Drawing Sheets

(56) References Cited

U.S. PATENT DOCUMENTS

| | | | |
|---|---|---|---|
| 2,191,946 A | 2/1940 | John | |
| 2,210,276 A * | 8/1940 | Bremer | F16H 7/0848 474/111 |
| 2,355,003 A * | 8/1944 | McCann | F16H 57/05 474/111 |
| 3,334,524 A * | 8/1967 | Ronald | F16G 1/28 474/111 |
| 3,441,009 A * | 4/1969 | Renzo | F02B 67/06 123/90.15 |
| 3,455,178 A * | 7/1969 | Ruoff | F16H 7/08 474/111 |
| 3,656,361 A * | 4/1972 | Honda | F16G 13/04 474/140 |
| 3,673,884 A * | 7/1972 | Southiere | B62D 55/07 474/111 |
| 3,817,113 A * | 6/1974 | Pfarrwaller | F16H 7/1281 474/134 |
| 4,069,719 A * | 1/1978 | Cancilla | B62M 9/16 474/134 |
| 4,337,055 A * | 6/1982 | Mackay | F16H 7/08 474/140 |
| 4,457,741 A * | 7/1984 | Hoeptner, III | F16H 7/129 403/368 |
| 4,662,862 A * | 5/1987 | Matson | F16H 7/08 474/111 |
| 4,869,708 A * | 9/1989 | Hoffmann | F01L 1/022 474/140 |
| 5,000,724 A * | 3/1991 | Reid | F16H 7/08 474/140 |
| 5,049,114 A * | 9/1991 | Hayden | F16H 7/08 474/111 |
| 5,122,098 A * | 6/1992 | Kanehira | F16H 7/0834 474/111 |
| 5,180,340 A * | 1/1993 | Vahabzadeh | F16H 7/08 474/140 |
| 5,234,381 A * | 8/1993 | Vahabzadeh | F16H 7/06 474/111 |
| 5,286,234 A * | 2/1994 | Young | F16H 7/08 474/140 |
| 5,445,568 A | 8/1995 | Fukuzawa et al. | |
| 5,524,725 A * | 6/1996 | Schantzen | F16H 7/08 474/111 |
| 5,730,674 A * | 3/1998 | Ott | F16H 7/08 474/111 |
| 5,776,024 A * | 7/1998 | White | F16H 7/0848 474/111 |
| 5,846,150 A * | 12/1998 | Wigsten | F16H 7/18 474/140 |
| 5,961,411 A | 10/1999 | Tsutsumi et al. | |
| 5,967,922 A | 10/1999 | Ullein et al. | |
| 6,062,998 A | 5/2000 | Kumakura et al. | |
| 6,117,034 A * | 9/2000 | Vine | F16H 7/1263 474/134 |
| 6,129,644 A * | 10/2000 | Inoue | F16H 7/0836 474/111 |
| 6,358,169 B1 * | 3/2002 | Markley | F16H 7/08 474/140 |
| 6,375,587 B1 * | 4/2002 | Wigsten | F16H 7/08 474/140 |
| 6,440,020 B1 * | 8/2002 | Tada | F16H 7/08 474/140 |
| 6,572,502 B1 | 6/2003 | Young et al. | |
| 6,599,209 B1 | 7/2003 | Ullein et al. | |
| 7,063,635 B2 | 6/2006 | Garcia | |
| 7,597,640 B2 | 10/2009 | Markley et al. | |
| 7,641,577 B2 | 1/2010 | Markley et al. | |
| 8,348,792 B2 | 1/2013 | He | |
| 8,900,079 B2 | 12/2014 | Mori et al. | |
| 9,482,336 B2 | 11/2016 | Utaki | |
| 9,534,516 B2 | 1/2017 | Utaki | |
| 9,759,292 B2 | 9/2017 | Moura et al. | |
| 9,797,483 B2 | 10/2017 | Kurono et al. | |
| 10,612,630 B2 | 4/2020 | Konno et al. | |
| 2002/0045503 A1 * | 4/2002 | Young | F16H 7/18 474/140 |
| 2002/0115511 A1 * | 8/2002 | Tada | F16H 7/0831 474/140 |
| 2003/0062015 A1 * | 4/2003 | Garza | F02B 67/06 123/192.2 |
| 2003/0228948 A1 * | 12/2003 | Garbagnati | F16H 7/0836 474/111 |
| 2004/0067806 A1 * | 4/2004 | Markley | F16H 7/0848 474/111 |
| 2005/0075204 A1 * | 4/2005 | Cholewczynski | F16H 7/18 474/140 |
| 2005/0107196 A1 | 5/2005 | Konno et al. | |
| 2006/0100047 A1 | 5/2006 | Churchill et al. | |
| 2006/0270502 A1 * | 11/2006 | Markley | F16H 7/08 474/140 |
| 2006/0293134 A1 * | 12/2006 | Markley | F16H 7/08 474/140 |
| 2007/0093328 A1 * | 4/2007 | Markley | F16H 7/0848 474/140 |
| 2009/0111629 A1 * | 4/2009 | Kobara | F02B 67/06 474/111 |
| 2009/0143177 A1 * | 6/2009 | Nakano | F01L 1/02 474/109 |
| 2009/0275430 A1 * | 11/2009 | Markley | F16H 7/0848 474/111 |
| 2009/0325750 A1 * | 12/2009 | Wigsten | F16H 7/0831 474/111 |
| 2010/0203991 A1 | 8/2010 | He | |
| 2010/0210384 A1 * | 8/2010 | Young | F16H 7/08 474/111 |
| 2010/0248876 A1 | 9/2010 | Kroon et al. | |
| 2012/0129636 A1 | 5/2012 | Lee et al. | |
| 2012/0225744 A1 * | 9/2012 | Markley | F16H 7/08 474/111 |
| 2013/0059686 A1 * | 3/2013 | Markley | F16H 7/08 474/111 |
| 2013/0059687 A1 * | 3/2013 | Markley | F16H 7/0831 474/111 |
| 2016/0102736 A1 * | 4/2016 | Suchecki | F01L 1/047 123/90.31 |
| 2016/0102738 A1 * | 4/2016 | Von Vopelius-Feldt | F16H 7/08 474/111 |
| 2016/0186840 A1 * | 6/2016 | Cipollone | F16H 7/08 474/140 |
| 2016/0265632 A1 * | 9/2016 | Young | F16H 7/08 |
| 2017/0009849 A1 * | 1/2017 | Stiglmaier | F16H 7/08 |
| 2017/0108111 A1 * | 4/2017 | Steward | F16H 57/0457 |
| 2017/0276216 A1 * | 9/2017 | Perissinotto | F16H 7/18 |
| 2018/0163848 A1 * | 6/2018 | Quinn | F16H 7/06 |
| 2018/0334928 A1 * | 11/2018 | Yamauchi | F16H 7/08 |
| 2019/0003558 A1 * | 1/2019 | Kumar | F16H 7/06 |
| 2019/0071286 A1 * | 3/2019 | Dong | F16H 7/08 |
| 2019/0072175 A1 * | 3/2019 | Klar | F16H 57/0486 |
| 2020/0157976 A1 | 5/2020 | Takahashi | F02B 67/06 |
| 2021/0262552 A1 * | 8/2021 | Seki | F16H 7/08 |
| 2022/0235852 A1 * | 7/2022 | Crump | F16H 7/06 |
| 2022/0325783 A1 * | 10/2022 | Schroeder | F16H 7/0829 |

FOREIGN PATENT DOCUMENTS

| | | | | |
|---|---|---|---|---|
| EP | 1164312 A3 | 6/2007 | | |
| GB | 2206175 A * | 12/1988 | | F01L 1/348 |
| JP | S4993493 U | 8/1974 | | |
| JP | S5121782 U | 2/1976 | | |
| JP | H03134351 A * | 6/1991 | | F16H 7/18 |
| JP | H06280608 A * | 10/1994 | | F16H 67/06 |
| JP | H07247858 A * | 9/1995 | | F16H 2007/185 |
| JP | 3383825 B2 * | 3/2003 | | F01L 1/02 |
| JP | 200428218 | 1/2004 | | |
| JP | 2005075122 A | 3/2005 | | |
| JP | 2008143249 A | 6/2008 | | |
| JP | 201213190 | 1/2012 | | |

(56) References Cited

FOREIGN PATENT DOCUMENTS

| JP | 2019120243 A | 7/2019 | | |
|---|---|---|---|---|
| WO | WO-2020068048 A1 * | 4/2020 | ............... | F16H 7/18 |
| WO | WO-2020157457 A1 * | 8/2020 | ............... | F16H 7/06 |

* cited by examiner

METHOD(S) TO APPLY TENSION TO INCREASE DRIVETRAIN JUMP TORQUE CAPACITY

CROSS-REFERENCE TO RELATED APPLICATIONS

This application claims priority pursuant to 35 U.S.C. 119(e) to U.S. Patent Application No. 63/140,457, filed Jan. 22, 2021, which application is incorporated herein by reference in its entirety.

BACKGROUND

The present invention relates to chain tensioner, and more specifically to a chain tensioner for a drive system which increases jump torques.

A tensioning device, such as a hydraulic tensioner, is used as a control device for a power transmission chain, or similar power transmission devices in the engine timing system, as the chain travels between a plurality of sprockets. In this device, the chain transmits power from a driving shaft to a driven shaft, so that part of the chain is slack and part of the chain is tight. Generally, it is important to impart and maintain a certain degree of tension in the chain to prevent noise, slippage, or the unmeshing of teeth (tooth jump) in the case of a toothed chain. Prevention of such slippage is particularly important in the case of a chain driven camshaft in an internal combustion engine because jumping of teeth will throw off the camshaft timing, possibly causing damage or rendering the engine inoperative.

In the harsh environment of an internal combustion engine, various factors can cause fluctuations in the chain tension. For instance, wide variations in temperature and thermal expansion coefficients among the various parts of the engine can cause the chain tension to vary between excessively high or low levels. During prolonged use, wear to the components of the power transmission system can cause a decrease in chain tension. In addition, camshaft and crankshaft induced torsional vibrations cause considerable variations in chain tensions. Reverse rotation of an engine, occurring for example during stopping of the engine or in failed attempts at starting, can also cause fluctuations in chain tension. For these reasons, a mechanism is desired to remove excessive tensioning forces on the tight side of the chain and to ensure the necessary tension on the slack side of the chain.

Currently in engine timing systems, a snubber, guide or tensioner is used to tension at least one strand of the chain to improve noise, vibration and harshness (NVH), by controlling strand resonance. Such chain strand management is not however seen in the drivetrain transfer cases.

Tensioning devices have not been used in drivetrain transfer cases for a number of reasons. The prior art has taught that tensioning the slack strand to take up chain slack can delay tooth jump, which equates to high tensioning forces and result in a greater jump torque, however, a tensioning device constantly applying a load to at least one strand of the chain reduces the system efficiency, such that high tensioning force results in greater jump torque, but worsens system efficiency significantly. The benefits associated with the improved jump torque performance does not outweigh the sacrifice in efficiency as shown in prior art FIG. 1 of jump torque (Nm) versus tensioning device spring load (N). As the tensioning device spring load increases, the jump torque improvement increases. The jump torque improvement is seen when the tensioning device spring load is greater than 65N and up through 220N. However, with an increase in the tensioning device spring load comes a decrease in system efficiency as shown in prior art graph FIG. 2. In FIG. 2, a system with no tensioner results in approximately a 99.3% system efficiency, whereas a 215 N spring, which has the greater jump torque results in approximately a 96.8% system efficiency, which is drastic.

SUMMARY

According to an embodiment of the present invention, a chain tensioning device combats natural build-up of chain slack. In controlling the chain slack, the torque at which a chain jumps occurs is delayed resulting in a higher jump torque performance.

BRIEF DESCRIPTION OF THE DRAWINGS

FIG. 5b is a detailed view of a first multi-pivot torsion spring tensioner of FIG. 5a.

FIG. 5c is a detailed view of a second multi-pivot torsion spring tensioner of FIG. 5a.

DETAILED DESCRIPTION

Figure 1:
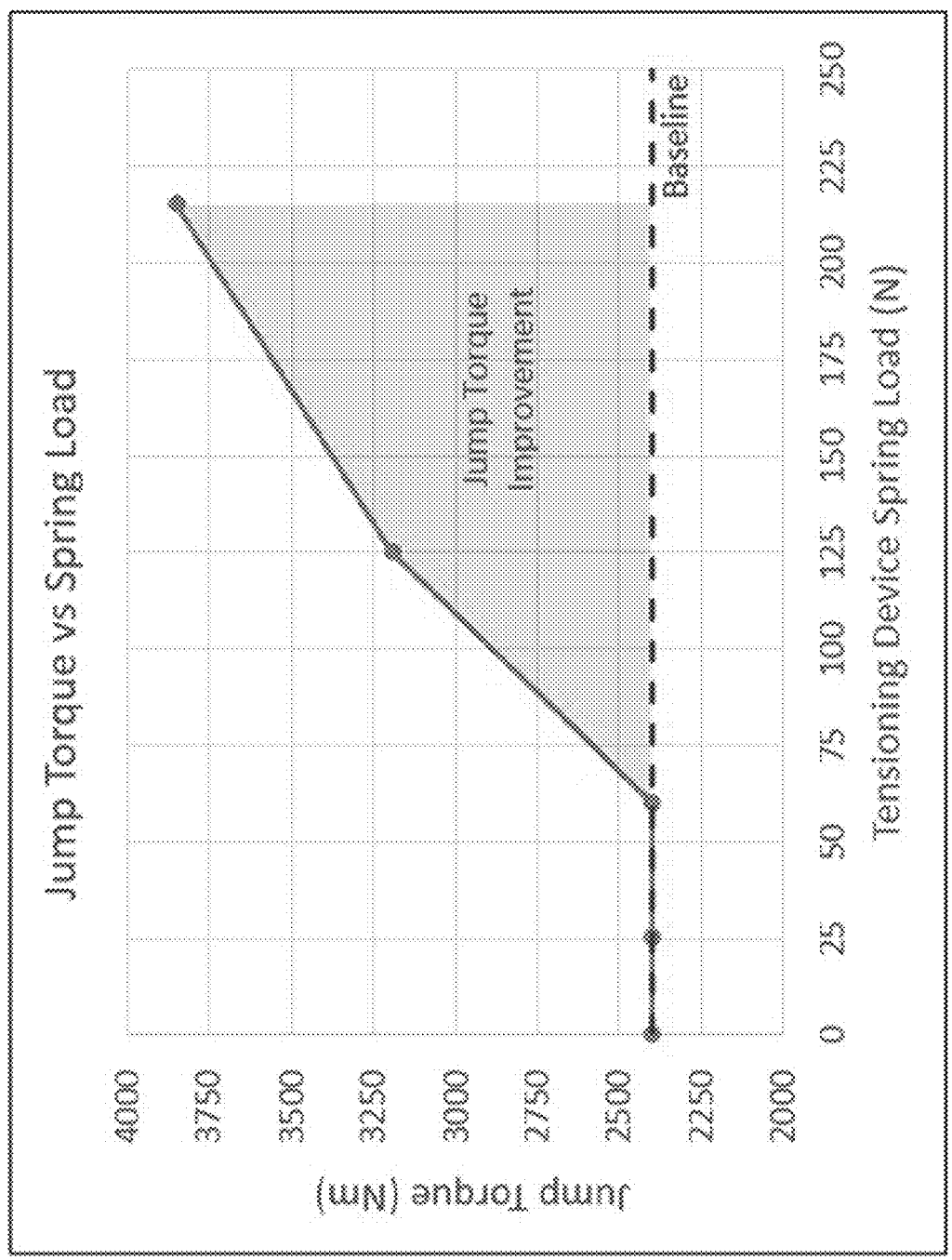
FIG. 1 shows a graph of a conventional tensioning device used in an engine timing system of jump torque (Nm) versus tensioning device spring load (N).
Figure 2:
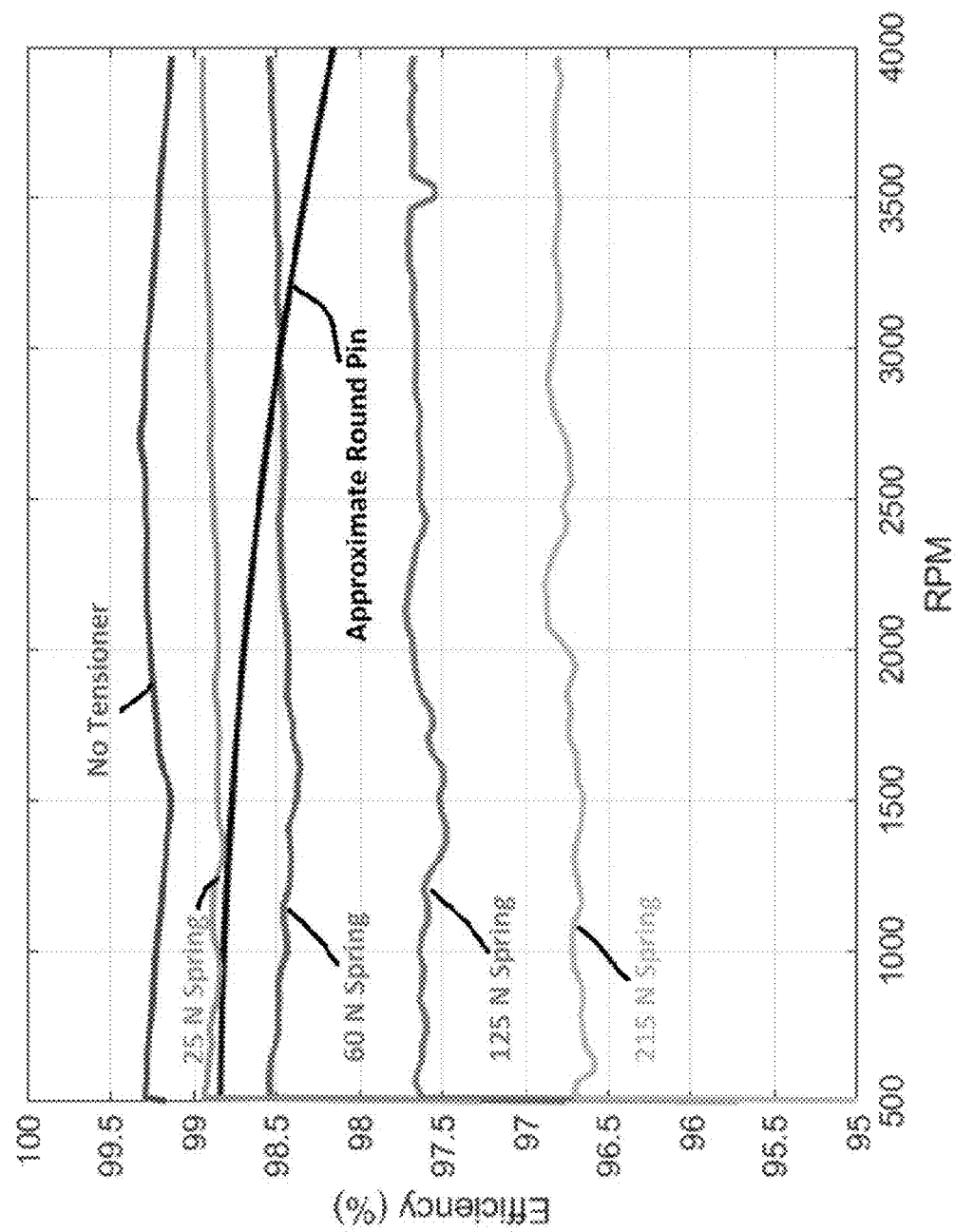
FIG. 2 shows a graph of a conventional drivetrain transfer case and associated efficiency depending on the spring load used.
Figure 3A:
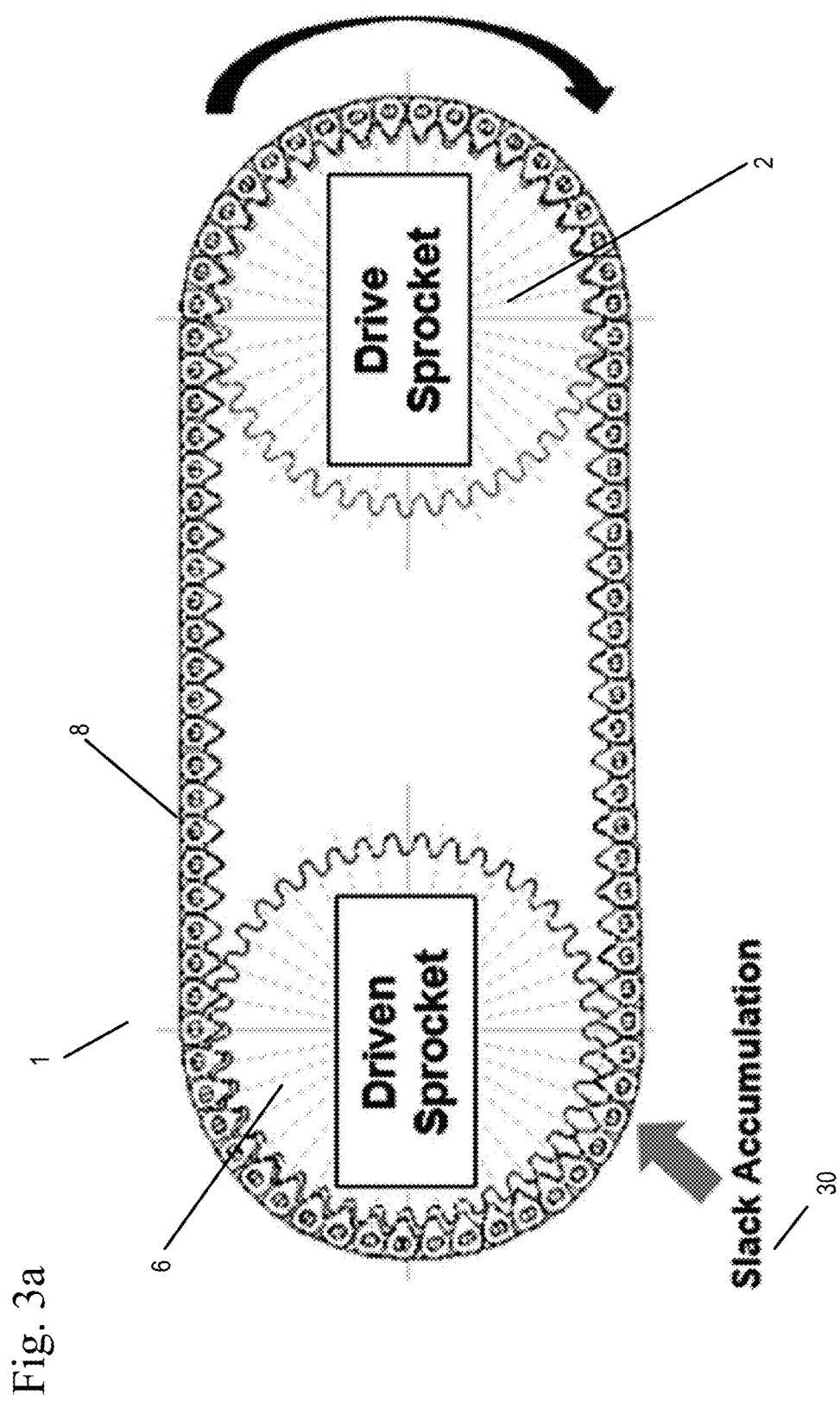
FIG. 3a shows a schematic of an approximate location of slack accumulation relative to the driven sprocket.
Figure 3B:
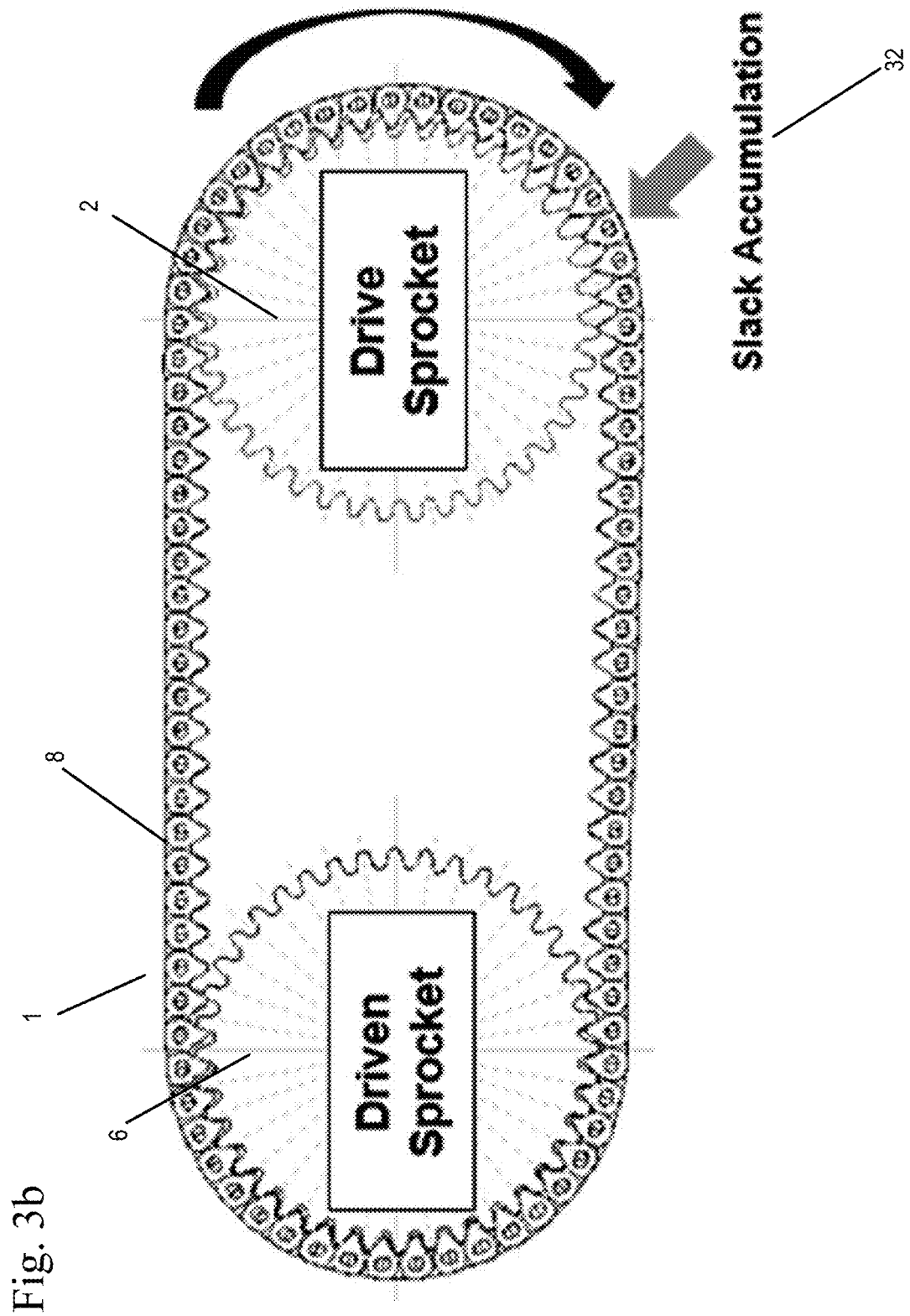
FIG. 3b shows a schematic of an approximate location of slack accumulation relative to the drive sprocket.

FIGS. 3a and 3b shows an approximate location of the slack accumulation 30, 32 relative to a driven sprocket 6 and a drive sprocket 2 of a chain system 1, respectively. The drive sprocket 2 is connected to the driven sprocket 6 via a toothed chain 8. The chain 8 meshes with the sprockets 2, 6, transmitting rotary motion between the sprockets. Through testing, it was discovered that a chain 8 can jump on either the driven sprocket 6 or the drive sprocket 2 of a chain system 1. Jumping of the chain 8 near the driven sprocket 6 results in a chain 8 with a lower jump torque and jumping of the chain 8 near the drive sprocket 2 results in a higher jump torque of the chain 8. Therefore, forcing jumps to only occur on the drive sprocket 2 allows a chain's jump torque performance to be higher. Through testing it was determined that there are specific locations in which chain slack collects relative to the driven or drive sprocket 6, 2, determining which sprocket the chain 8 will jump. FIG. 3a shows the slack accumulation occurring at the driven sprocket 6, indicated by reference number 30 and FIG. 3*b* shows the slack accumulation occurring at the drive sprocket 2, indicated by reference number 32.

Placement of at least one conventional tensioning device at specific places on the chain strands of the chain between the driven and drive sprockets in a transfer case can be used to force drive sprocket jumps, increasing the chain's jump torque rating, thus allowing narrower chains to be applied while maintaining the system's jump torque requirement. Therefore, forcing drive sprocket jumps for narrow chain and sprockets provides the advantages of reducing mass and reducing cost. For example, by forcing jumps to occur closer to the drive sprocket, the chain can be reduced in width by ¼ inch (6.35 mm). Therefore, in a conventional chain system with a chain requiring 1.5 inch wide chain (38.10 mm), application of a tensioning device of the current invention allows for narrower chain to be used, for example 1.25 inches (31.75 mm) in width. Differing application designs and requirements may allow for greater or less than the ¼ inch (6.35 mm) width reduction. Embodiments of the present invention can apply to chains which are between ½ inch (12.70 mm) to 2 inches (50.8 mm) in diameter.

Figure 4:
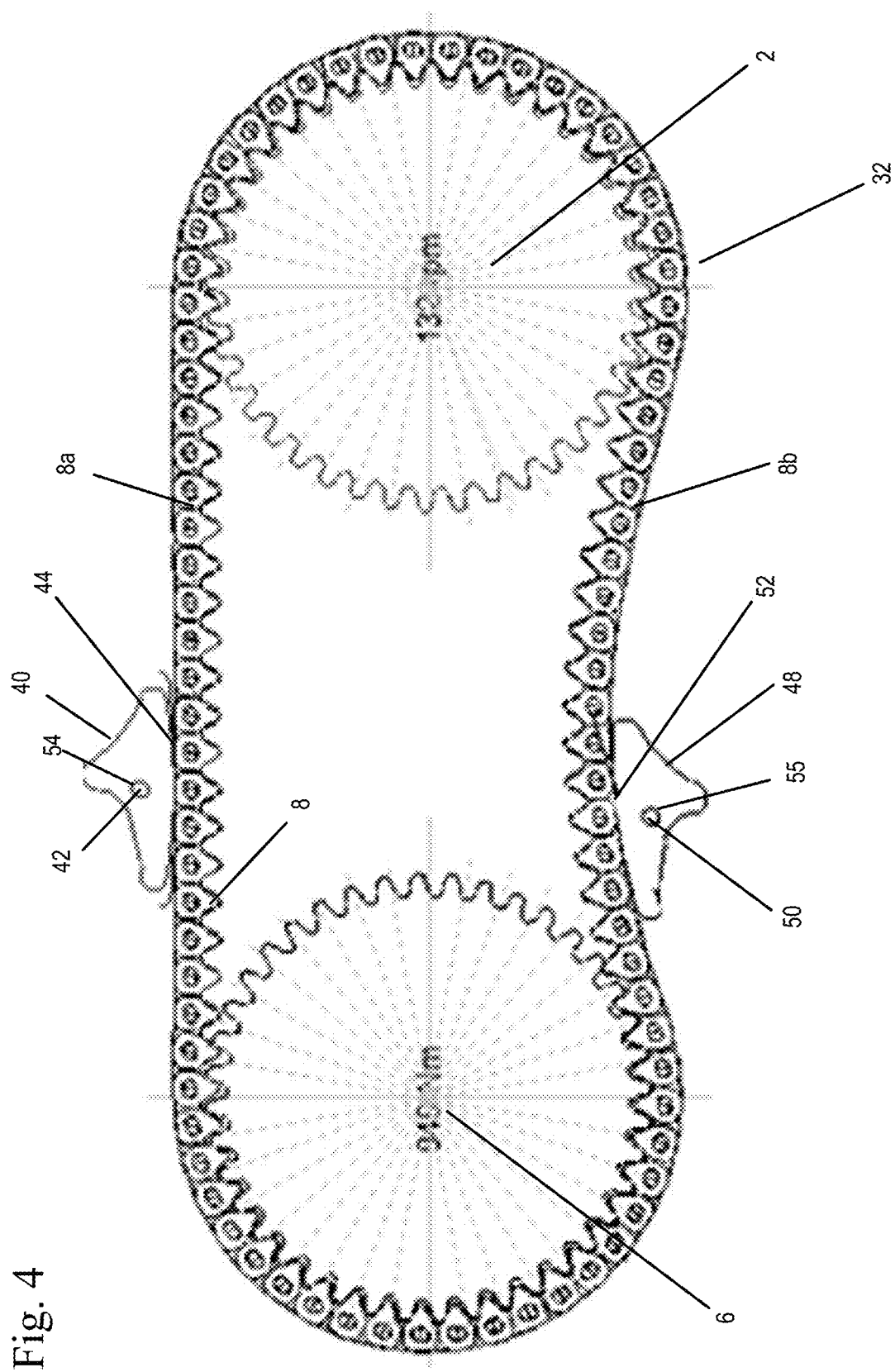
FIG. 4 shows a schematic of a chain system with tensioning devices applied asymmetrically toward the driven sprocket.

Through additional studies it was determined that low force springs can force drive sprocket jumps when the tensioning device is applied asymmetrically towards the driven sprocket as shown in FIG. 4. In FIG. 4, a first tensioner device 40 with a single pivot point has a chain sliding surface 44 which can engage with a first strand 8*a* of the chain 8 and is mounted relative to the chain 8 at a first mounting position. In one embodiment, the first tensioner device 40 can be triangular in shape with the single pivot pin 42 being received at a pivot pin hole 54 at a central point opposite the chain sliding surface 44. Opposite the first tensioner device 40 is a second tensioner device 48 with a single pivot point and a chain sliding surface 52 which can engage with the second strand 8*b* of the chain 8 and is mounted at a second mounting position. In one embodiment, the second tensioner device 48 can be triangular in shape with the single pivot pin 50 being received at a pivot pin hole 55 at a central point opposite the chain sliding surface 52. The pivot pins 42, 50 are preferably mounted to the drivetrain transfer case. It is noted that the placement or mounting positions of the first and second tensioner devices 40, 48 is closer to the driven sprocket 6 than the drive sprocket 2, such that the tension to either strand 8*a*, 8*b* of the chain 8 is being applied asymmetrically toward the driven sprocket 6, thus allowing slack of the chain 8 to instead accumulate near the drive sprocket 2 at location 32 as in FIG. 3*b*.

Figure 6:
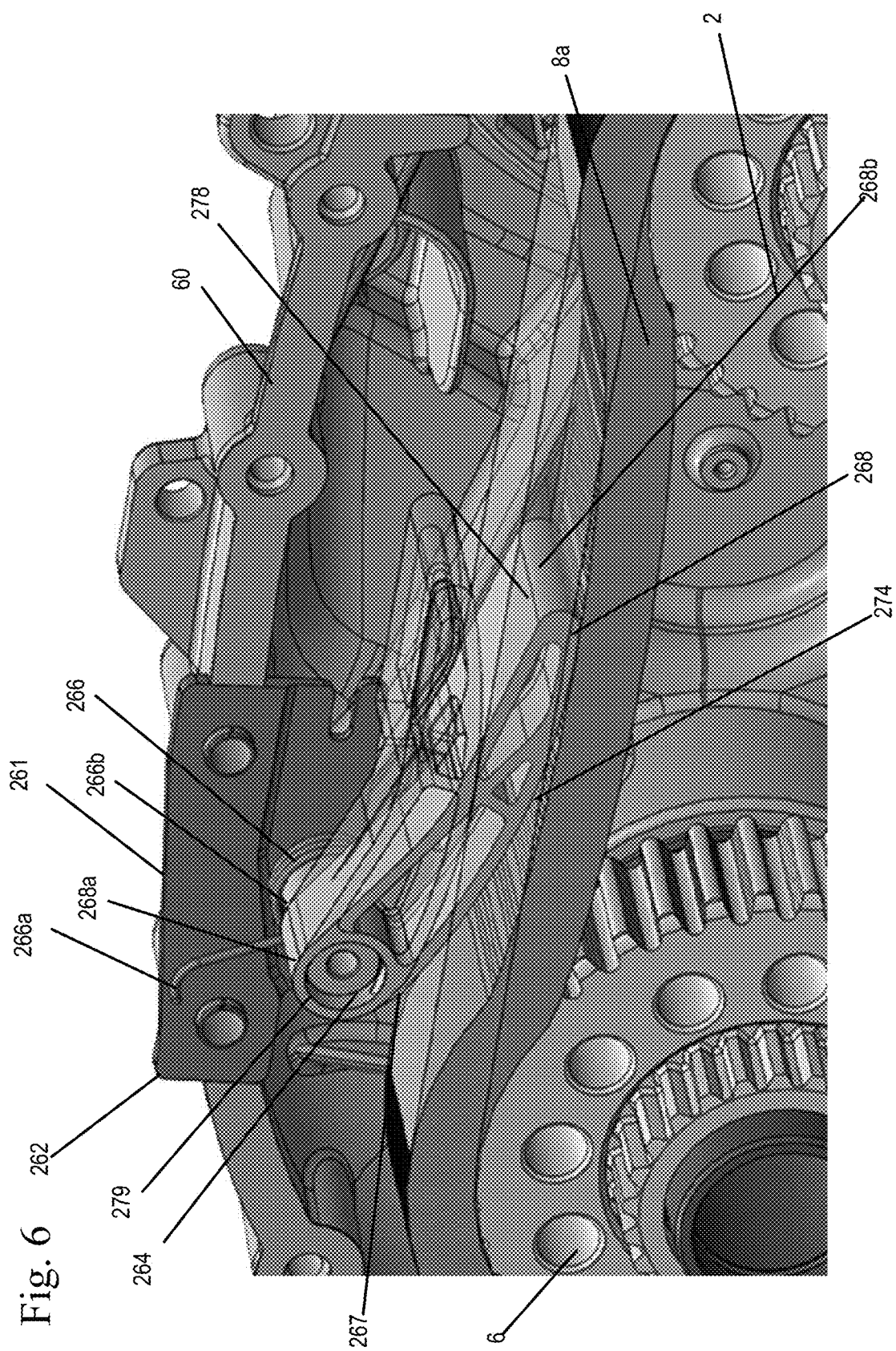
FIG. 6 is a partial view of a drivetrain transfer case including a torsion spring tensioner of a second embodiment.

Furthermore, with the tensioning force applied at the driven sprocket 6, forcing the tooth jump to occur at the drive sprocket 2, a low force spring, as applied to the tensioner devices is required, for example such that a 25 N torsion spring could be used resulting in approximately 98.9% efficiency, reducing the negative impact on system efficiency as shown in FIG. 6. Additionally, as conventionally known, tensioning a chain strand can improve NVH by controlling strand resonance.

In a preferred embodiment, a chain system in a drivetrain transfer case includes at least a chain with a drive sprocket, a driven sprocket, and at least one tensioning device. The chain, the drive sprocket, and driven sprocket have a ¼ in (6.35 mm) reduction on width compared to conventional chain systems in drivetrain transfer cases. The mass of the at least one tensioning device is less than the mass saved in the reduction to the chain, drive sprocket and driven sprocket. For example, if a conventional application requires a 1.5" (38.10 mm) wide chain, the present invention uses a narrower 1.25" (31.75 mm) width chain with the same efficiency. Differing application designs and requirements may allow for greater or less than a ¼" (6.35 mm) width reduction. It is noted that the ¼ inch width reduction is related to generic chain size naming. Actual dimensions vary slightly. Furthermore, as the chain is narrowed, the sprockets can also be narrowed.

FIGS. 5*a*-8 show chains systems within a drivetrain transfer case that include at least one tensioning device that reduced the size and mass of the chain system, while maintaining system efficiency, and without increasing cost.

Figure 5A:
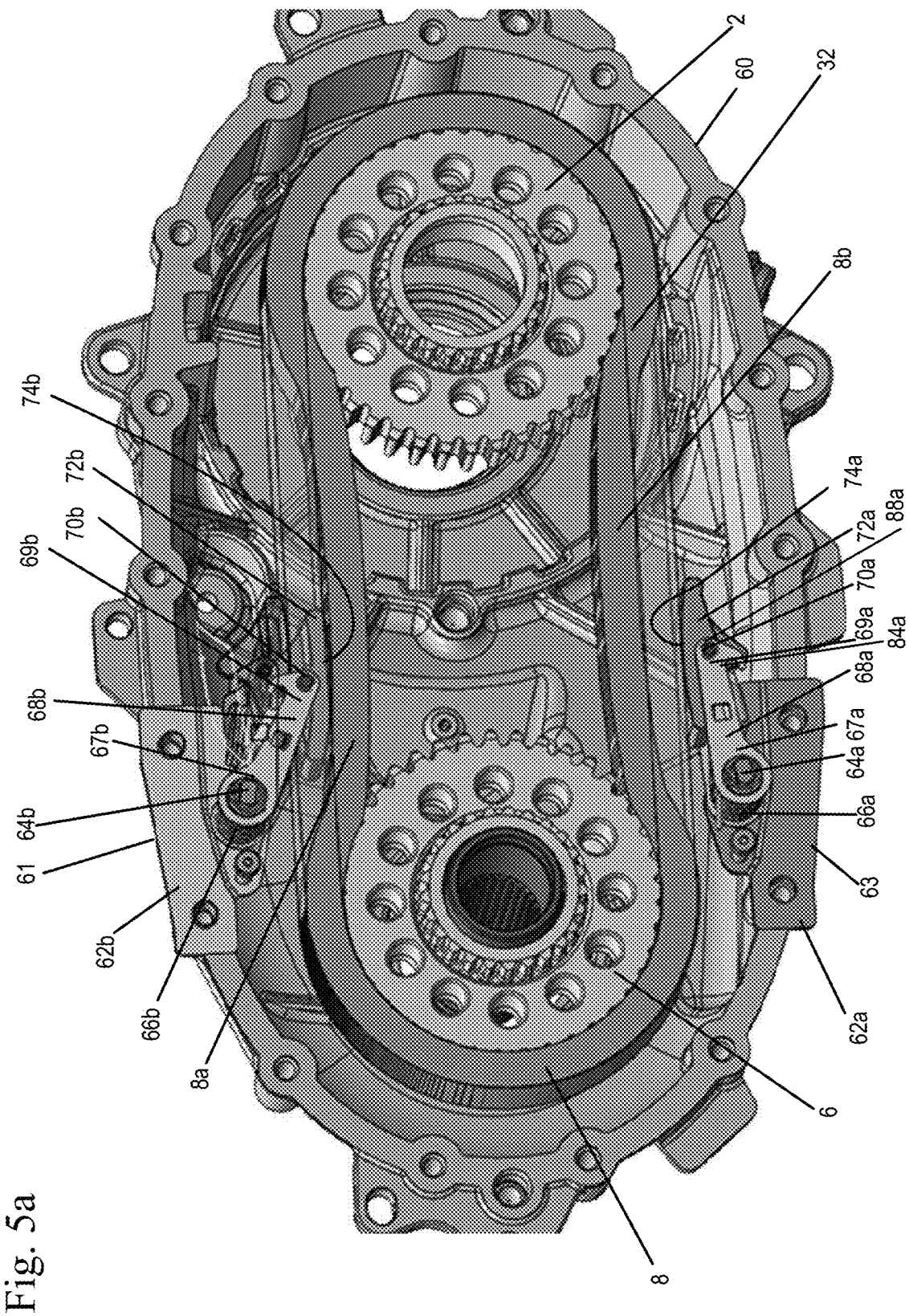
FIG. 5a is a schematic of a chain system within a drivetrain transfer case including a first and a second multi-pivot torsion spring tensioners of a first embodiment.
Figure 5B:
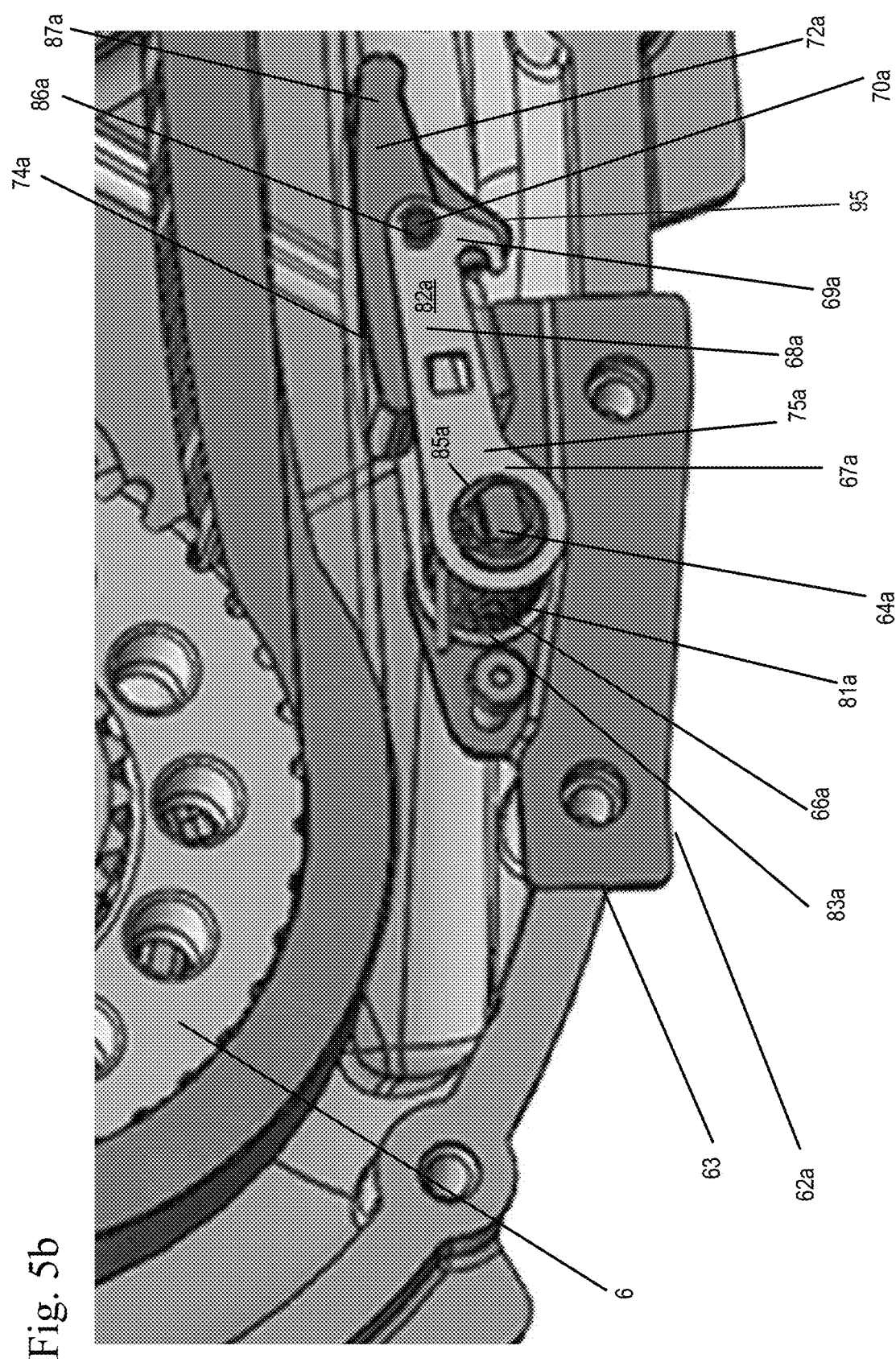
Figure 5C:
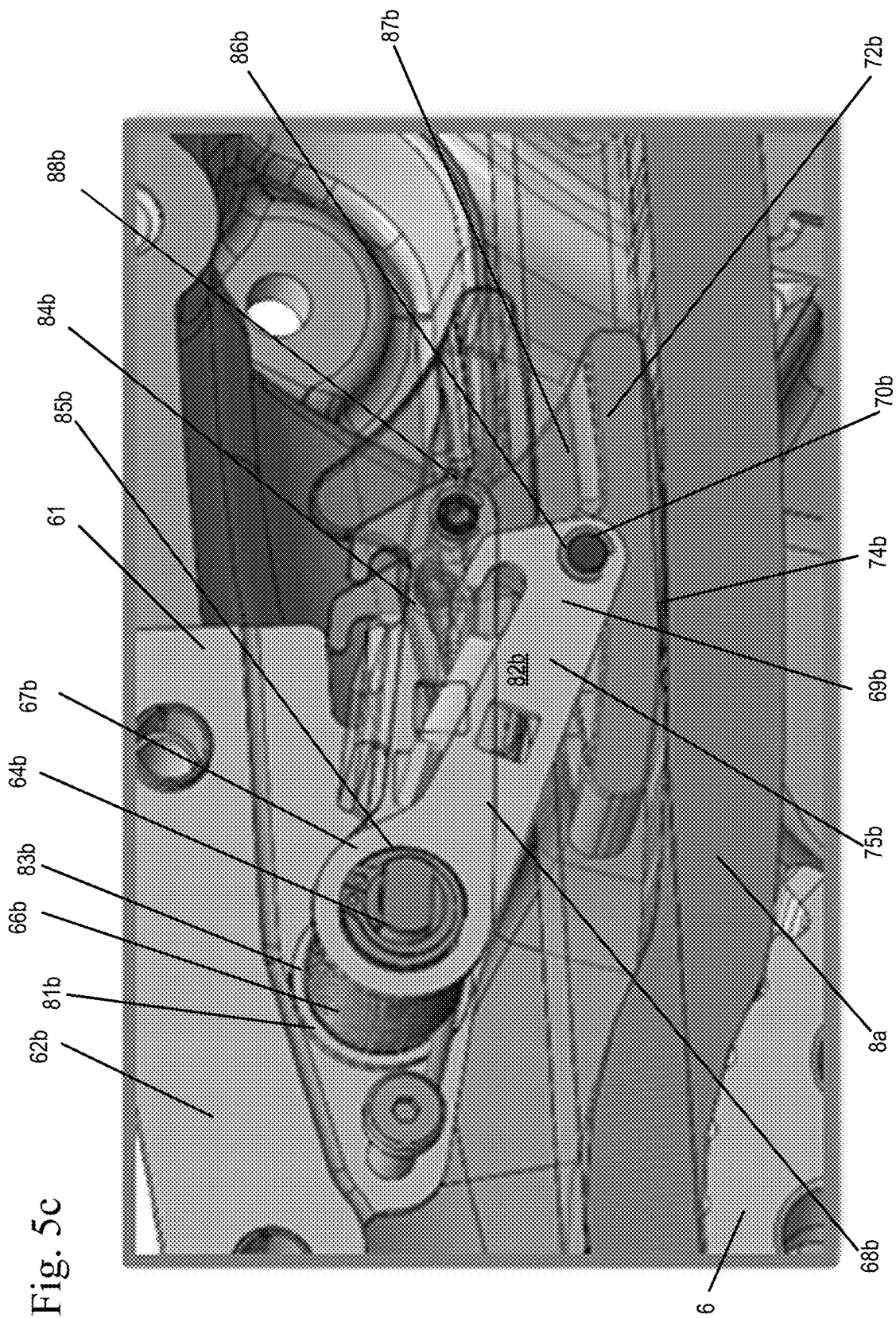

FIGS. 5*a*-5*c* shows schematics of a chain system within a drivetrain transfer case including first and second multi-pivot torsion spring tensioners of a second embodiment. The drivetrain transfer case 60 receives a drive sprocket 2, a driven sprocket 6, a chain 8, a first multi-pivot torsion spring tensioner 61 and a second multi-pivot torsion spring tensioner 63. The drive sprocket 2 is connected to the driven sprocket 6 via the toothed chain 8. The chain 8 meshes with the sprockets 2, 6, transmitting rotary motion between the two sprockets.

The first and second multi-pivot torsion spring tensioners 61, 63 each have a mounting bracket 62*a*, 62*b* with a pivot axle 64*a*, 64*b* extending perpendicular therefrom.

Each tensioner 61, 63 also includes an arm 68*a*, 68*b* that has a body 75*a*, 75*b* which includes a first plate 81*a*, 81*b* a second plate 82*a*, 82*b*, and a pivot pin 70*a*, 70*b*. The first plate 81*a*, 81*b* and the second plate 82*a*, 82*b* of each arm 68*a*, 68*b* each have a first end 67*a*, 67*b* and a second end 69*a*, 69*b*. The first plate 81*a*, 81*b* has a first hole 83*a*, 83*b* at the first end 67*a*, 67*b*, and a second hole 84*a*, 84*b* at the second end 69*a*, 69*b*. The second plate 82*a*, 82*b* has a first hole 85*a*, 85*b* at the first end 67*a*, 67*b* and a second hole 86*a*, 86*b* at the second end 69*a*, 69*b*. The first plate 81*a*, 81*b* and the second plate 82*a*, 82*b* are connected together and aligned by the pivot axle 64*a*, 64*b* of the mounting bracket 62*a*, 62*b* and a pivot pin 70*a*, 70*b* received within the second holes 84*a*, 84*b*, 86*a*, 86*b* of the first plate 81*a*, 81*b* and the second plate 82*a*, 82*b*. The distance between the first plate 81*a*, 81*b* and the second plate 82*a*, 82*b* is equivalent to at least a portion of the length of the pivot axle 64*a*, 64*b* and the pivot pin 70*a*, 70*b*. The first hole 83*a*, 83*b*, 85*a*, 85*b* of the first end 67*a*, 67*b* of the first plate 81*a*, 81*b* and the second plate 82*a*, 82*b* receive the pivot axle 64*a*, 64*b* and the torsion spring 66*a*, 66*b*. The pivot axle 64*a*, 64*b* is surrounded by a torsion spring 66*a*, 66*b*, with a first end of the torsion spring 66*a*, 66*b* biasing the arm 68*a*, 68*b* towards the chain 8 and a second end of the torsion spring 66*a*, 66*b* is mounted to the mounting bracket 62*a*, 62*b*.

Mounted to the pivot pin 70*a*, 70*b* at the second end 69*a*, 69*b* of the first plate 81*a*, 81*b* and the second plate 82*a*, 82*b* and between the first plate 81*a*, 81*b* and the second plate 82*a*, 82*b* is a tensioning foot 72*a*, 72*b*. The tensioning foot 72*a*, 72*b* has a body 87*a*, 87*b* with a pivot point hole 88*a*, 88*b* and a chain sliding surface 74*a*, 74*b*. The tensioning foot 72*a*, 72*b* receives the pivot pin 70*a*, 70*b* within the pivot point hole 88*a*, 88*b* of the body 87*a*, 87*b*, with the associated pivot point being opposite the chain sliding surface 74*a*, 74*b*. In one embodiment, the pivot point hole 88*a*, 88*b* is centrally located opposite chain sliding surface 74*a*, 74*b* which interacts with the chain 8.

In this embodiment, the multi-pivot torsion spring tensioners 61, 63 have two pivot points, the pivot axle 64*a*, 64*b* and the pivot pin 70*a*, 70*b* connecting the arm 68*a*, 68*b* to the tensioning foot 72*a*, 72*b*. The arms 68*a*, 68*b* preferably have rigid bodies.

The first and second torsion spring tensioners 61, 63 are each fixed via the mounting brackets 62a, 62b to the transfer case 60 closer to the driven sprocket 6 than the drive sprocket 2, such that the tension to either strand 8a, 8b of the chain 8 is being applied asymmetrically toward the driven sprocket 6, thus allowing slack of the chain 8 to instead accumulate near the drive sprocket 2 at slack location 32.

The first and second multi-pivot torsion spring tensioners 61, 63 provide:
- minimum slack strand mechanical preload or force to the chain to prevent or force tooth jump to the drive sprocket;
- minimized tight strand mechanical preload or force;
- tensioner chain sliding surface travel to manage dynamic chain slack for forward and reverse drive and static chain wear; and
- limiting chain sliding surface and chain motion during chain tooth jump events.

A stop feature 95 can be added to prevent tensioner device damage from a tooth jump event. During a tooth jump event, the tensioning device can rotate away from the chain strands 8a, 8b, with the rotation being limited by the interface between the stop feature 95 and the drivetrain transfer case 60. A stop feature 95, is shown as being applied to the tensioner foot 72a, 72b in FIG. 5a-5b, however the stop feature 95 can also be applied to the tensioner arm or tensioner face. The stop feature 95 creates a "low stress" contact so as not to damage the tensioner or reduce the tensioner's ability to control chain slack.

The torsion spring 66a, 66b can be designed with low spring rates, applying lower force to the strands 8a, 8b of the chain 8 in order to achieve a balance between tensioner position with the application to minimize spring force and rates for optimized chain slack 8a, 8b control and efficiency.

In this embodiment, the arm 68a, 68b of the first and second multi-pivot torsion spring tensioners 61, 63 acts as a constant moment arm with the tensioner foot 72a, 72b during articulation and results in a constant force through the range of motion, optimizing control and system efficiency. Additionally, the package can be reduced, as the tensioners 61, 63 cover a large articulation angle.

FIG. 6 is a partial view of a drivetrain transfer case including a torsion spring tensioner of a third embodiment. The drivetrain transfer case 60 receives a drive sprocket 2, a driven sprocket 6, a chain 8, and a single pivot torsion spring tensioner 261. The drive sprocket 2 is connected to the driven sprocket 6 via the toothed chain 8. The chain 8 meshes with the sprockets 2, 6, transmitting rotary motion between the two.

The single pivot torsion spring tensioner 261 has a mounting bracket 262 with a pivot axle 264 extending perpendicular therefrom. The pivot axle 264 receives an arm 268. The arm 268 preferably has a single piece body 278, but can be manufactured from multiple pieces. The arm 268 has a body 278 with a first end 268a, a second end 268b, and a chain sliding surface 274 which interacts with a single chain strand 8a close to the driven sprocket 6. At the first end 268a of the body 278 is a hole 279 for receiving the pivot axle 264.

A torsion spring 266 is present between the mounting bracket 262 and acts upon the first end 267 of the one-piece arm 268 on the pivot axle 264. One end 266a of the spring 266 is grounded relative to the mounting bracket 262 and the second end 266b contacts the arm 268.

Placement of the single pivot torsion spring tensioner 261 mounted closer to the driven sprocket 6 than the drive sprocket 2 results in asymmetric tension being applied to the strand 8a, such that the slack of the chain accumulates near the drive sprocket 2.

Figure 7:
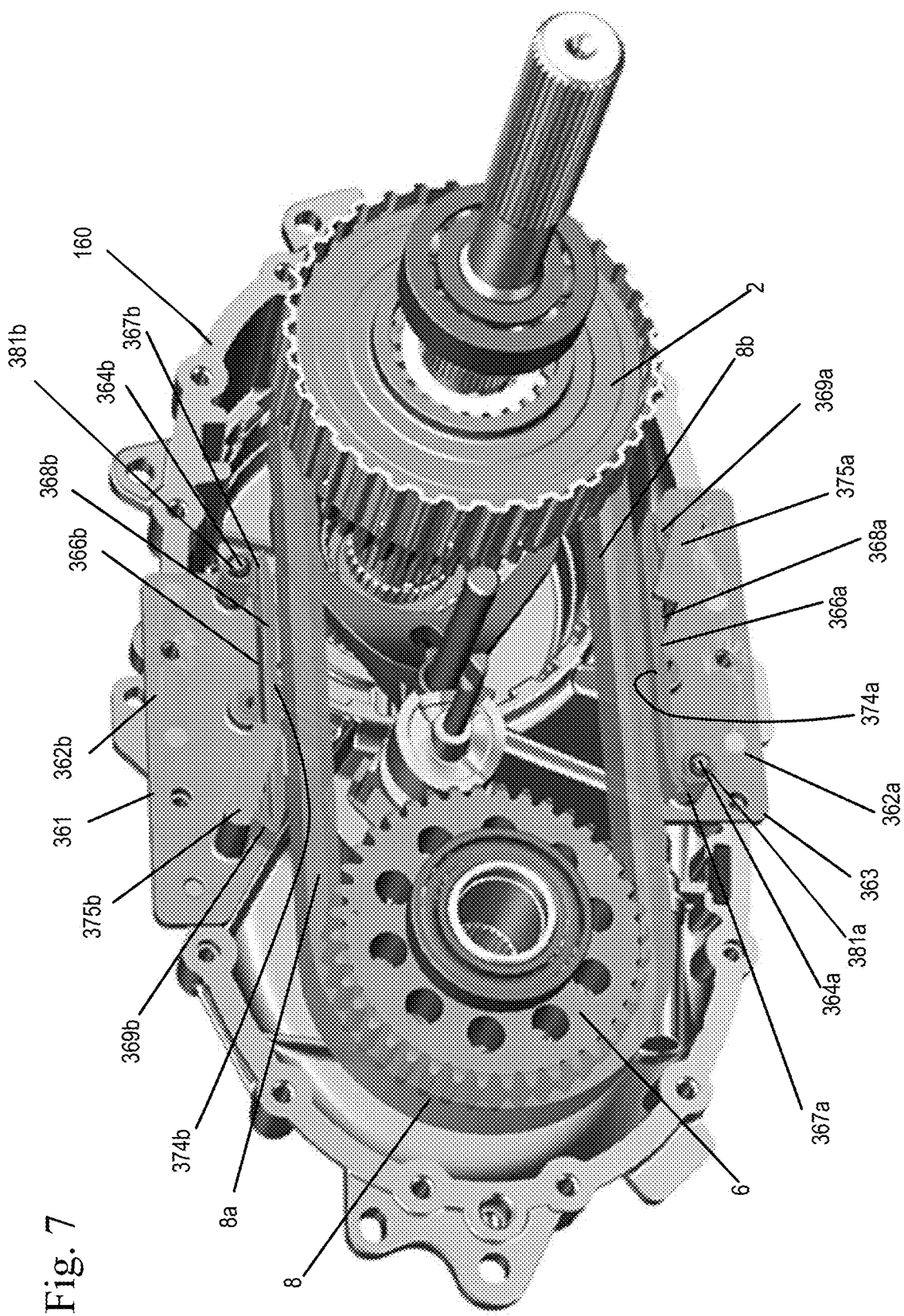
FIG. 7 shows a schematic of a chain system within a drivetrain transfer case including a blade spring tensioner of a third embodiment.

FIG. 7 shows a schematic of a chain system within a drivetrain transfer case including a blade spring tensioner of a fourth embodiment.

The drivetrain transfer case 60 receives a drive sprocket 2, a driven sprocket 6, a chain 8, a first blade spring tensioner 361 and a second blade spring tensioner 363. The drive sprocket 2 is connected to the driven sprocket 6 via the toothed chain 8. The chain 8 meshes with the sprockets 2, 6, transmitting rotary motion between the two.

The first and second blade spring tensioners 361, 363 each have a mounting bracket 362a, 362b with a pivot axle 364a, 364b extending perpendicular therefrom and a mounting surface 375a, 375b. The pivot axle 364a, 364b pivotably receives a first end 367a, 367b of the resilient blade tensioner arm body 368a, 368b via a pivot hole 381a, 381b. The second end 369a, 369b of the resilient blade tensioner arm body 368a, 368b is adjacent to and interacts with the mounting surface 375a, 375b. The resilient blade tensioner arm body 368a, 368b has a chain sliding surface 374a, 374b with a profile of a path of a new chain that interacts with a chain strand 8a, 8b of the chain 8. Opposite the chain sliding surface 374a, 374b is a means for receiving and containing at least the ends of a blade spring 366a, 366b. The blade spring 366a, 366b can be contained by pockets formed by the tensioner arm body 368a, 368b of the tensioner, tabs or other means of securing at least the ends of the blade spring 366a, 366b to the tensioner body 368a. 368b such that the blade spring 366a, 366b can bow. The resilient blade tensioner arm body 368a, 368b and the blade spring 366a, 366b can flex and bow outwards and away from the mounting surface 375a, 375b.

The first and second blade spring tensioners 361, 363 are each fixed via the mounting brackets 362a, 362b to the transfer case 160 closer to the driven sprocket 6 than the drive sprocket 2, such that the tension to either strand 8a, 8b of the chain 8 is being applied asymmetrically toward the driven sprocket 6, thus allowing slack of the chain 8 to instead accumulate near the drive sprocket 2.

Figure 8:
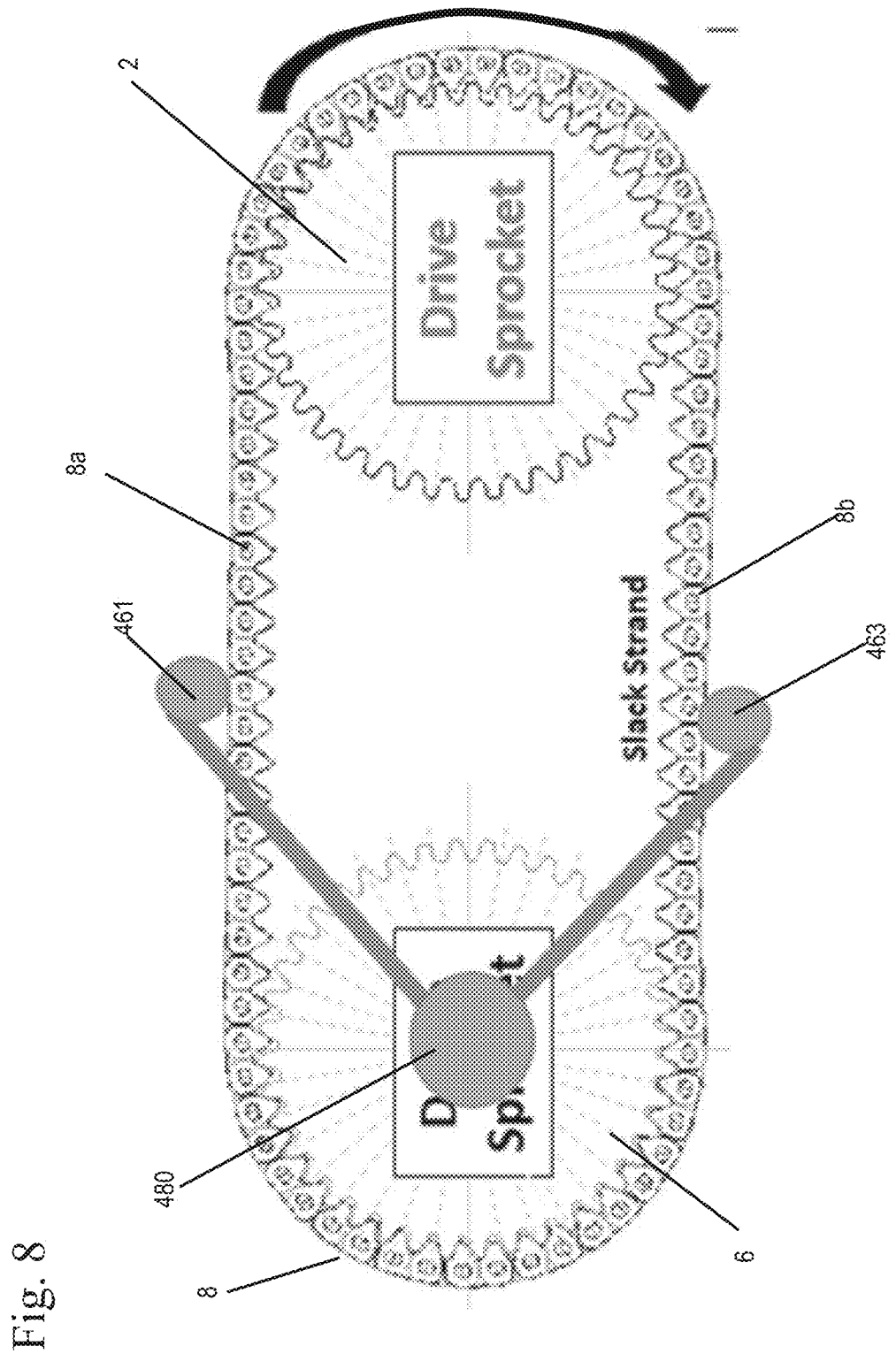
FIG. 8 shows a schematic of a chain system with a dual strand tensioner.

FIG. 8 shows a schematic of a chain system with a dual strand tensioner.

A drivetrain transfer case receives a drive sprocket 2, a driven sprocket 6, a chain 8, a first tensioner 461 and a second tensioner 463. The drive sprocket 2 is connected to the driven sprocket 6 via the toothed chain 8. The chain 8 meshes with the sprockets 2, 6, transmitting rotary motion between the two.

In this embodiment, a first tensioner 461 and a second tensioner 463 act on chain strands 8a, 8b adjacent the driven sprocket 6. The first tensioner 461 and the second tensioner 463 are mechanically connected 480 together, such that rotation towards a strand 8a of the chain 8 by the first tensioner 461 causes the second blade spring tensioner 463 to pivot away from the opposite chain strand 8b.

The first and second tensioners 461, 463 are each mounted closer to the driven sprocket 6 than the drive sprocket 2, such that the tension to either strand 8a, 8b of the chain 8 is being applied asymmetrically toward the driven sprocket 6, thus allowing slack of the chain 8 to instead accumulate near the drive sprocket 2.

While not shown, in an alternate embodiment, the first tensioning device can be a different device than the second tensioning device. In an example, the first tensioning device is first multi-pivot torsion spring 61 and the second tensioning device is a second blade spring tensioner 363. This example is not limiting, and other combinations are possible.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A chain system within a drivetrain transfer case of an engine comprising:
    a drive sprocket;
    a driven sprocket;
    a chain connecting the drive sprocket to the driven sprocket, the chain having a slack strand between the driven sprocket and the drive sprocket and a tight strand between the driven sprocket and the drive sprocket;
    a first tensioner mounted within the drivetrain transfer case to interact with the slack strand of the chain at a first mounting position closer to the driven sprocket than the drive sprocket applying tension asymmetrically towards the driven sprocket, such that slack of the chain accumulates adjacent the drive sprocket, increasing a jump torque of the chain; and
    a second tensioner mounted within the drivetrain transfer case to interact with the tight strand of the chain at a second mounting position closer to the driven sprocket than the drive sprocket;
    wherein the first tensioner comprises:
    a first tensioner mounting bracket mounted to the drivetrain transfer case having a pivot axle extending perpendicular therefrom;
    a first tensioner arm comprising a body with a first tensioner arm end, the first tensioner arm comprising:
        a first plate defining a first hole at a first end of the first plate for receiving the pivot axle and a second hole at a second end of the first plate;
        a second plate defining a first hole at a first end of the second plate for receiving the pivot axle and a second hole at a second end of the second plate;
        a pivot pin received within second hole of the first plate and the second hole of the second plate;
    a first tensioning arm tensioning foot received between the first plate and the second plate comprising a body defining a pivot hole for receiving the pivot pin and having a chain sliding surface adapted to interact with the slack strand of the chain, the pivot hole opposite the chain sliding surface; and
    a torsion spring mounted between the first tensioner arm mounting bracket and the first tensioner arm biasing the first tensioner arm end of the first tensioner arm on the pivot axle towards the slack strand of the chain;
    wherein the second tensioner comprises:
    a second tensioner mounting bracket mounted to the drivetrain transfer case having a pivot axle extending perpendicular therefrom;
    a second tensioner arm comprising a body comprising:
        a first plate defining a first hole at a first end of the first plate for receiving the pivot axle of the second tensioner mounting bracket and a second hole at a second end of the first plate;
        a second plate defining a first hole at a first end of the second plate for receiving the pivot axle of the second tensioner mounting bracket and a second hole at a second end of the second plate;
        a pivot pin received within second hole of the first plate of the second tensioner arm and the second hole of the second plate of the second tensioner arm;
    a second tensioner arm tensioning foot received between the first plate and the second plate of the second tensioner arm comprising a body defining a pivot hole for receiving the pivot pin of the second tensioner arm and having a chain sliding surface adapted to interact with the tight strand of the chain, the pivot hole opposite the chain sliding surface; and
    a torsion spring mounted between the second tensioner arm mounting bracket and the second tensioner arm biasing a first end of the second tensioner arm on the corresponding pivot axle towards the tight strand of the chain.

2. The chain system of claim 1, wherein a first end of the torsion spring of the first tensioner is grounded to the first tensioner arm mounting bracket and a second end of the torsion spring of the first tensioner contacts the first end of the first tensioner arm.

3. The chain system of claim 1, further comprising a first tensioner arm stop mounted to the first tensioner arm tensioning foot adapted to prevent tensioner device damage from a tooth jump event by limiting rotation of the first tensioner arm tensioning foot through an interface between the drivetrain transfer case and the first tensioner arm stop and a second tensioner arm stop mounted to the second tensioner arm tensioning foot adapted to prevent tensioner device damage from a tooth jump event by limiting rotation of the second tensioner arm tensioning foot through an interface between the drivetrain transfer case and the second tensioner arm stop.

4. The chain system of claim 1, wherein the chain has a width between 12.70 mm to 50.8 mm.

* * * * *